United States Patent
Anderson

(10) Patent No.: US 10,693,513 B2
(45) Date of Patent: Jun. 23, 2020

(54) IQ IMBALANCE ESTIMATOR

(71) Applicant: Imagination Technologies Limited, Kings Langley (GB)

(72) Inventor: Adrian John Anderson, Chepstow (GB)

(73) Assignee: Imagination Technologies Limited, Kings Langley (GB)

( * ) Notice: Subject to any disclaimer, the term of this patent is extended or adjusted under 35 U.S.C. 154(b) by 457 days.

(21) Appl. No.: 14/977,988

(22) Filed: Dec. 22, 2015

(65) Prior Publication Data

US 2016/0182106 A1    Jun. 23, 2016

(30) Foreign Application Priority Data

Dec. 22, 2014   (GB) .................................. 1423000.7

(51) Int. Cl.
*H04B 1/30* (2006.01)
(52) U.S. Cl.
CPC ..................................... *H04B 1/30* (2013.01)
(58) Field of Classification Search
CPC ..... H04L 27/3863; H04L 5/0007; H04B 3/23; H04B 7/15585
See application file for complete search history.

(56) References Cited

U.S. PATENT DOCUMENTS

| | | | |
|---|---|---|---|
| 6,289,048 B1 | 9/2001 | Richards et al. | |
| 6,792,054 B1 | 9/2004 | Bitran et al. | |
| 7,184,714 B1* | 2/2007 | Kutagulla | H04B 1/40 375/295 |
| 7,251,291 B1* | 7/2007 | Dubuc | H04L 5/0048 375/285 |
| 7,274,750 B1* | 9/2007 | Mueller | H04B 1/30 375/297 |

(Continued)

FOREIGN PATENT DOCUMENTS

| | | | | |
|---|---|---|---|---|
| EP | 1793548 A1 * | 6/2007 | ......... | H04L 27/2657 |
| EP | 2109273 A1 * | 10/2009 | ......... | H04L 27/3863 |

(Continued)

OTHER PUBLICATIONS

M. Valkama and M. Renfors, "Advanced DSP for I/Q imbalance compensation in a low-IF receiver," Communications, 2000. ICC 2000. 2000 IEEE International Conference on, New Orleans, LA, 2000, pp. 768-772 vol. 2.*

(Continued)

*Primary Examiner* — Berhanu Tadese
(74) *Attorney, Agent, or Firm* — Potomac Law Group, PLLC; Vincent M DeLuca

(57) ABSTRACT

An IQ amplitude balance estimator is described herein which uses a positive frequency mixer to generate two outputs. The first output is the standard output from a positive frequency mixer and the second output corresponds to a spectrum inverted output from a negative frequency mixer. The second output is generated, however, using the same partial products as the first output and no negative frequency mixer is used. An IQ amplitude imbalance metric is generated by taking the real part of the output from correlation logic which performs a correlation of the two outputs from the mixer. This metric may then be used in a closed loop to compensate for any IQ amplitude imbalance.

18 Claims, 5 Drawing Sheets

(56) References Cited

U.S. PATENT DOCUMENTS

| | | | | |
|---|---|---|---|---|
| 7,366,255 B1* | 4/2008 | Hwang | H04L 27/2647 | 375/260 |
| 7,433,298 B1* | 10/2008 | Narasimhan | H04L 25/0228 | 370/206 |
| 7,822,399 B2* | 10/2010 | Wallen | H04B 1/126 | 455/285 |
| 8,238,458 B2* | 8/2012 | Sethia | H04L 27/3863 | 327/551 |
| 8,711,904 B2* | 4/2014 | Debaillie | H04L 27/364 | 375/219 |
| 8,942,317 B2* | 1/2015 | Chari | H04L 7/042 | 375/285 |
| 9,154,338 B1* | 10/2015 | Tsatsanis | H04L 43/12 | |
| 2004/0002323 A1* | 1/2004 | Zheng | H03D 3/009 | 455/324 |
| 2005/0075815 A1* | 4/2005 | Webster | H03C 3/406 | 702/106 |
| 2005/0123067 A1* | 6/2005 | Kim | H03D 3/009 | 375/298 |
| 2005/0276354 A1* | 12/2005 | Su | H04L 27/3863 | 375/326 |
| 2006/0079195 A1* | 4/2006 | Beamish | H04B 1/30 | 455/313 |
| 2006/0109893 A1* | 5/2006 | Chen | H04L 27/364 | 375/219 |
| 2006/0281429 A1* | 12/2006 | Kishi | H03D 7/166 | 455/313 |
| 2007/0025433 A1* | 2/2007 | Hammerschmidt | H04B 17/21 | 375/224 |
| 2008/0056397 A1* | 3/2008 | Li | H04L 27/3863 | 375/260 |
| 2008/0089443 A1* | 4/2008 | Sanada | H04L 27/2657 | 375/319 |
| 2008/0130779 A1* | 6/2008 | Levi | H03D 3/009 | 375/267 |
| 2008/0219386 A1* | 9/2008 | Chrabieh | H04L 27/3863 | 375/343 |
| 2008/0273608 A1* | 11/2008 | Jonsson | H04L 27/2647 | 375/260 |
| 2008/0279221 A1* | 11/2008 | Wen | H04L 27/2647 | 370/500 |
| 2008/0310534 A1* | 12/2008 | Egashira | H04L 5/0051 | 375/260 |
| 2009/0028231 A1* | 1/2009 | Lee | H04L 27/364 | 375/226 |
| 2009/0034651 A1* | 2/2009 | Lan | H04L 25/061 | 375/296 |
| 2009/0034666 A1* | 2/2009 | Lindoff | H04B 1/123 | 375/349 |
| 2009/0036079 A1* | 2/2009 | Lindoff | H03D 3/009 | 455/246.1 |
| 2009/0175398 A1* | 7/2009 | Inanoglu | H04L 27/0014 | 375/376 |
| 2009/0196334 A1* | 8/2009 | Bai | H04L 27/3863 | 375/226 |
| 2009/0323861 A1* | 12/2009 | Safavi | H04L 27/2647 | 375/302 |
| 2009/0325516 A1* | 12/2009 | Safavi | H04L 27/364 | 455/126 |
| 2010/0008449 A1* | 1/2010 | Sayers | H03D 3/009 | 375/322 |
| 2010/0215125 A1* | 8/2010 | Furman | H04L 25/06 | 375/319 |
| 2010/0329397 A1* | 12/2010 | Kim | H04L 27/3863 | 375/345 |
| 2011/0064166 A1* | 3/2011 | Khoshgard | H04L 27/3863 | 375/324 |
| 2011/0194656 A1* | 8/2011 | Shaked | H04L 27/0014 | 375/346 |
| 2011/0222638 A1* | 9/2011 | Park | H04L 27/3863 | 375/346 |
| 2011/0228826 A1* | 9/2011 | Yokoo | H04L 27/0014 | 375/219 |
| 2011/0268232 A1* | 11/2011 | Park | H04B 1/30 | 375/344 |
| 2012/0039375 A1* | 2/2012 | Eitel | H04L 27/3863 | 375/224 |
| 2012/0115412 A1* | 5/2012 | Gainey | H04B 3/23 | 455/7 |
| 2012/0163434 A1* | 6/2012 | Kim | H04B 1/0007 | 375/222 |
| 2012/0328053 A1* | 12/2012 | Janani | H04L 27/2657 | 375/320 |
| 2013/0128931 A1* | 5/2013 | Lin | H04B 17/11 | 375/219 |
| 2013/0251057 A1* | 9/2013 | Hamila | H04L 27/2646 | 375/260 |
| 2014/0044158 A1* | 2/2014 | Raghu | H04L 27/3863 | 375/224 |
| 2014/0140379 A1* | 5/2014 | Teplitsky | H04L 27/364 | 375/219 |
| 2014/0148112 A1* | 5/2014 | Sundstrom | H04B 3/46 | 455/226.1 |
| 2014/0177761 A1* | 6/2014 | Patel | H04L 25/00 | 375/340 |
| 2014/0254644 A1* | 9/2014 | Gotman | H04L 27/367 | 375/222 |
| 2014/0355722 A1* | 12/2014 | Hsu | H04L 27/364 | 375/340 |
| 2014/0362955 A1* | 12/2014 | Muhammad | H04B 1/16 | 375/343 |
| 2015/0016571 A1* | 1/2015 | McCoy | H04L 1/0038 | 375/319 |
| 2015/0071391 A1* | 3/2015 | Wilhelmsson | H04L 27/3863 | 375/346 |
| 2015/0092724 A1* | 4/2015 | Xiao | H04L 27/2602 | 370/329 |
| 2015/0092827 A1* | 4/2015 | Traverso | H04L 25/0224 | 375/224 |
| 2015/0117577 A1* | 4/2015 | Valadon | H04L 27/3863 | 375/350 |
| 2015/0180415 A1* | 6/2015 | Fernandes Barros | H03D 3/009 | 375/219 |
| 2015/0236739 A1* | 8/2015 | Montalvo | H03M 1/121 | 455/307 |
| 2017/0302482 A1* | 10/2017 | Pathikulangara | H04L 25/0226 | |

FOREIGN PATENT DOCUMENTS

| | | | | |
|---|---|---|---|---|
| EP | 2194665 A1 * | 6/2010 | | H04L 27/2613 |
| WO | WO-2008026178 A2 * | 3/2008 | | H03D 3/009 |
| WO | WO-2009082457 A2 * | 7/2009 | | H04B 1/28 |
| WO | WO-2010000297 A1 * | 1/2010 | | H04L 27/3863 |
| WO | WO-2010124298 A2 * | 10/2010 | | H04L 27/364 |
| WO | WO-2013149247 A1 * | 10/2013 | | H04L 25/022 |
| WO | WO-2014015700 A1 * | 1/2014 | | H04L 27/3863 |
| WO | WO-2014168766 A1 * | 10/2014 | | H04L 27/3863 |

OTHER PUBLICATIONS

M. Jeong et al., "A 65nm CMOS low-power small-size multistandard, multiband mobile broadcasting receiver SoC," 2010 IEEE International Solid-State Circuits Conference—(ISSCC), San Francisco, CA, 2010, pp. 460-461.*

* cited by examiner

IQ IMBALANCE ESTIMATOR

BACKGROUND

The waveform received at a radio receiver (e.g. an FM or DAB receiver) may be described in terms of its in-phase (I) and quadrature (Q) components and within a receiver there may be separate paths for each of the I and Q components. In a receiver where the I and Q paths are not exactly balanced in both amplitude and phase, the resulting IQ imbalance causes a signal at frequency F to suffer interference from its mirror image at frequency −F and it is not possible to filter out this interference because the interference occurs at the same frequency as the signal itself. Unless the IQ imbalance or the resulting interference is corrected, the interference results in an increase in the error rate of the receiver. The effect of any IQ imbalance increases for higher order modulation schemes, (e.g. QPSK or 16-QAM).

A known way of calculating the IQ amplitude imbalance is to measure the amplitude of both the I and Q components and then to take the difference between the two values. This difference can then be used to correct for the IQ amplitude imbalance.

The embodiments described below are not limited to implementations which solve any or all of the disadvantages of known receivers (e.g. radio, TV and WiFi™ receivers).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An IQ amplitude balance estimator is described herein which uses a positive frequency mixer to generate two outputs. The first output is the standard output from a positive frequency mixer and the second output corresponds to a spectrum inverted output from a negative frequency mixer. The second output is generated, however, using the same partial products as the first output and no negative frequency mixer is used. An IQ amplitude imbalance metric is generated by taking the real part of the output from correlation logic which performs a correlation of the two outputs from the mixer. This metric may then be used in a closed loop to compensate for any IQ amplitude imbalance.

A first aspect provides an apparatus comprising: an input arranged to receive a signal; a mixer arranged to mix the received signal with a local oscillator signal and to generate a first mixer output and a second mixer output; and correlation logic arranged to generate an IQ amplitude imbalance metric by calculating a correlation of the first and second mixer outputs.

A second aspect provides a method comprising: receiving a signal; mixing the signal with a local oscillator signal to generate a first and a second mixer output; and calculating an IQ amplitude imbalance metric by performing a correlation of the first and second mixer outputs.

Further aspects provide a computer readable storage medium having encoded thereon computer readable program code for generating a receiver comprising the apparatus as described herein and a computer readable storage medium having encoded thereon computer readable program code for generating a receiver configured to perform the method as described herein.

The methods described herein may be performed by a computer configured with software in machine readable form stored on a non-transitory storage medium e.g. in the form of computer readable code for configuring a computer to perform the constituent portions of described methods or in the form of non-transitory computer code adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

This acknowledges that firmware and software can be separately used and valuable. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
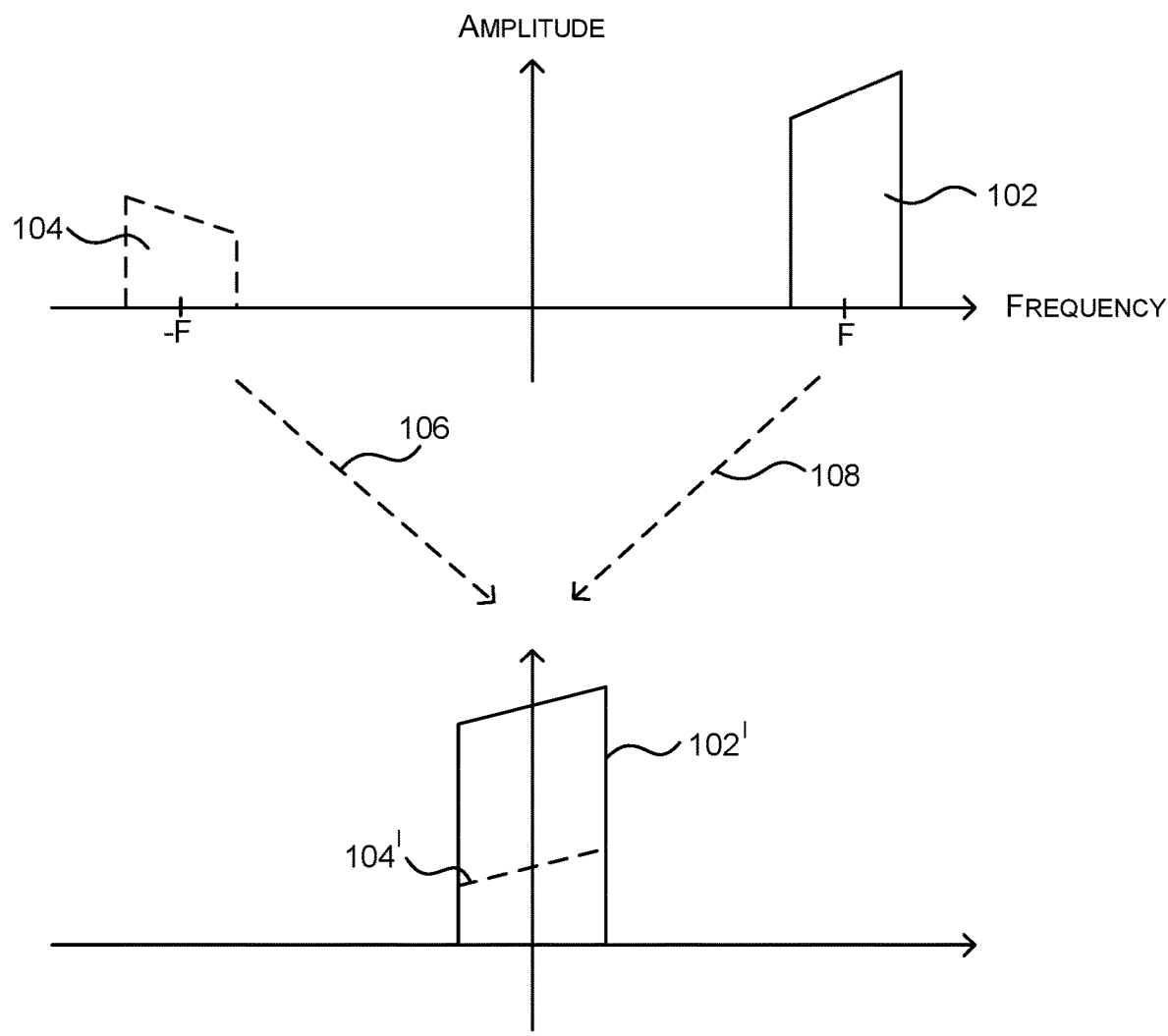
FIG. 1 shows a graphical representation of a signal and its mirror image which is the result of an IQ imbalance.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

As described above, where the I and Q paths within a receiver, and in particular a direct conversion receiver, are not exactly balanced in both amplitude and phase, the consequent IQ imbalance results in a signal at frequency F suffering interference from its mirror image at frequency −F.

A known solution is to determine the IQ imbalance and then use this to correct for the imbalance. The IQ amplitude imbalance is determined by measuring the amplitude of the I and Q components and calculating the difference between the measured amplitude values. However, the variance on each amplitude measurement (i.e. the amplitude measurement of the in-phase component and the amplitude measurement of the quadrature component) can be high and so the variance on the resulting value for IQ amplitude imbalance is also high and this is particularly true for signals which do not have a constant envelope (e.g. OFDM). This variance in measurements necessitates averaging over long periods of time (e.g. over a number of seconds) which adds considerable undesirable delay when performing channel selection, particularly where there are strict standards on the required rejection between the signal frequency and adjacent signals (e.g. 70 dB in the case of certain radio standards).

An improved method and apparatus for estimating IQ amplitude imbalance is described herein which does not rely on measuring the I and Q amplitudes. Instead, the method uses a correlation between the signal at frequency F and the signal at frequency −F (where F is the center frequency of the channel). FIG. 1 shows a graphical representation of signal 102 and its mirror image 104 which is the result of an IQ imbalance. In the method described herein, the signals at F and −F are shifted to baseband 102', 104' (as indicated by arrows 106) and the spectrum of one of the signals (e.g. the signal 104 at −F) is inverted so that the two overlap (i.e. so that the signal at −x aligns with the signal +x within the frequency band of interest). The correlation coefficient between the two signals is then calculated and the real part of the correlation coefficient is used as an estimate of the IQ amplitude imbalance. This estimate can then be used in a closed loop (e.g. to feed back or feed forward) to compensate for the IQ imbalance (e.g. by feeding a signal to an amplifier in either the Q or I path of the demodulator to adjust the amplitude of one path or the other or by correcting it digitally in the signal processor by application a multiplication to the incoming I or Q signal).

It will be appreciated that although the above description of FIG. 1 refers to shifting the signals to baseband, in other examples, the signals may be shifted to any common frequency and the spectrum of one of the signals (i.e. the signal at +F or −F) inverted, such that they overlap (i.e. a signal at −x aligns with a signal at +x within the frequency band of interest).

In the absence of any IQ imbalance, there will not be any mirror image 104 (since the mirror image is generated as a result of the IQ imbalance) and so there should be no correlation between the shifted signals (i.e. shifted mirror image 104' will be absent and the real part of the correlation coefficient will be zero); however, in the presence of some IQ imbalance, there will be a correlation between the shifted original and mirror image signals 102', 104' (and the real part of the correlation coefficient will be non-zero). It will be appreciated that, although not shown in FIG. 1, there may be another signal at frequency −F (in addition to any mirror image signal 104); however, as this is generated separately from the signal at F and is unrelated to the signal at F, there will be no correlation between that other signal at −F (when frequency shifted and inverted) and the shifted version of the signal at F 102'.

The real part of the correlation coefficient is a much quieter (i.e. less noisy) parameter than the amplitude difference (e.g. it does not vary with envelope variation) and so an estimate of the IQ amplitude imbalance can be obtained much more quickly than when using measured amplitudes (i.e. it requires significantly less averaging). Alternatively, averaging may still be used and a much more accurate estimate of the IQ amplitude imbalance can be achieved using the real part of the correlation coefficient in a similar time period. In further examples, there may be less averaging (than is required when using measures of amplitude) in order to obtain a more accurate answer more quickly (although this result will not be as accurate as using the same amount of averaging as known systems nor be obtained as quickly as where no averaging is used).

Figure 2:
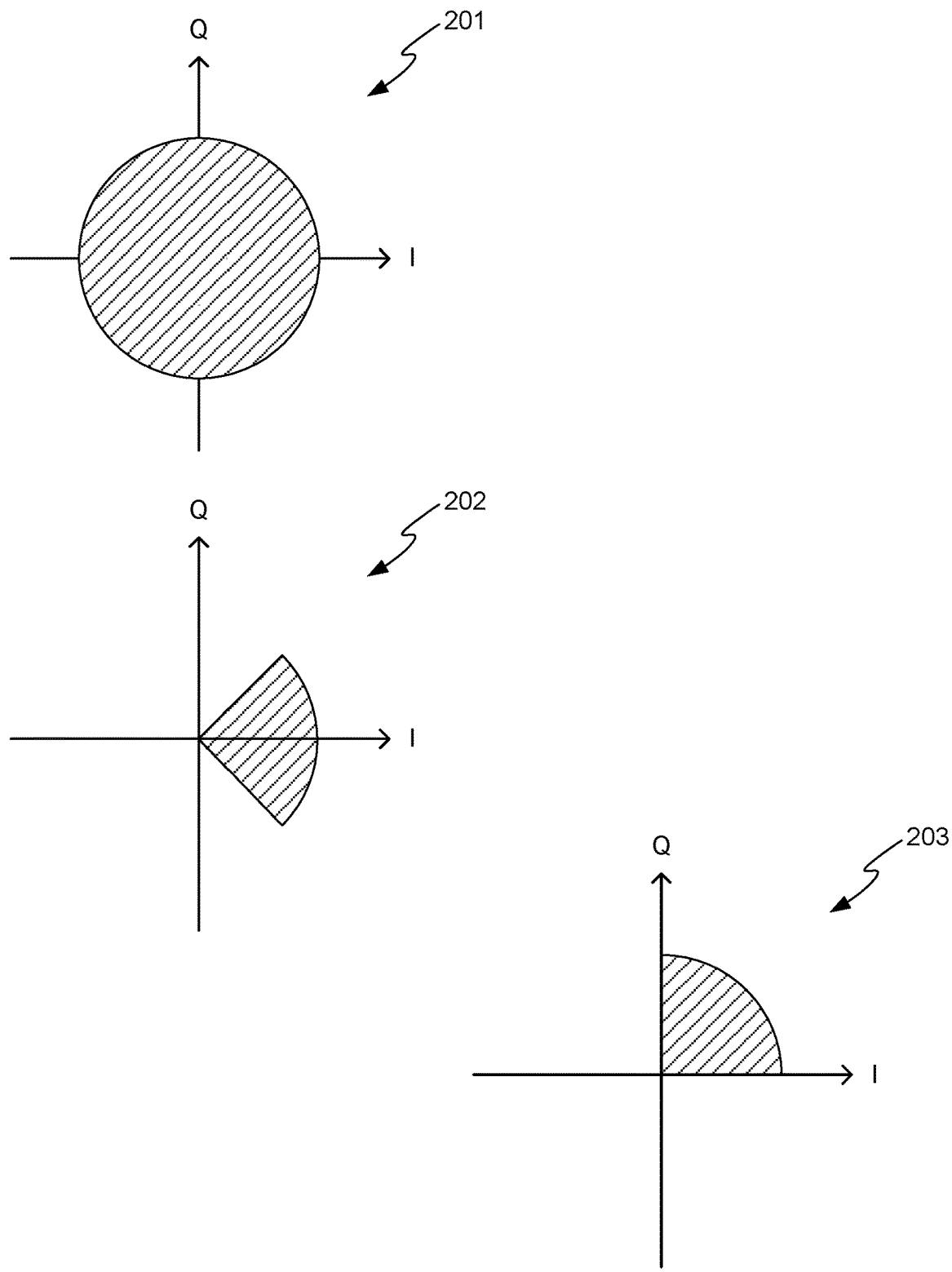
FIG. 2 shows two examples of signals which are balanced in their distribution of phase angles and one example of a signal which is not balanced.

Furthermore, where the received signal power is known, the real part of the correlation coefficient provides a very accurate estimate of the IQ amplitude imbalance. Additionally, unlike the amplitude difference (i.e. the difference between the measured amplitude of the I-component and the measured amplitude of the Q-component), the real part of the correlation coefficient is insensitive to FM radio signals which are not totally balanced in their distribution of phase angles (i.e. about the axis where the phase angle is zero) and so will provide an accurate IQ amplitude imbalance estimate even in such situations. FIG. 2 shows two examples 201, 202 of signals which are balanced in their distribution of phase angles (where the shaded parts indicate the range of phase angles traversed) and one example 203 of a signal which is not balanced.

The methods described herein may be implemented in a fully integrated receiver, where the term 'fully integrated' refers to the fact that they are implemented in silicon (i.e. they are single chip receivers). These fully integrated receivers may be direct conversion receivers as a direct conversion receiver does not require any large passive components (which are hard to implement in silicon).

Figure 3:
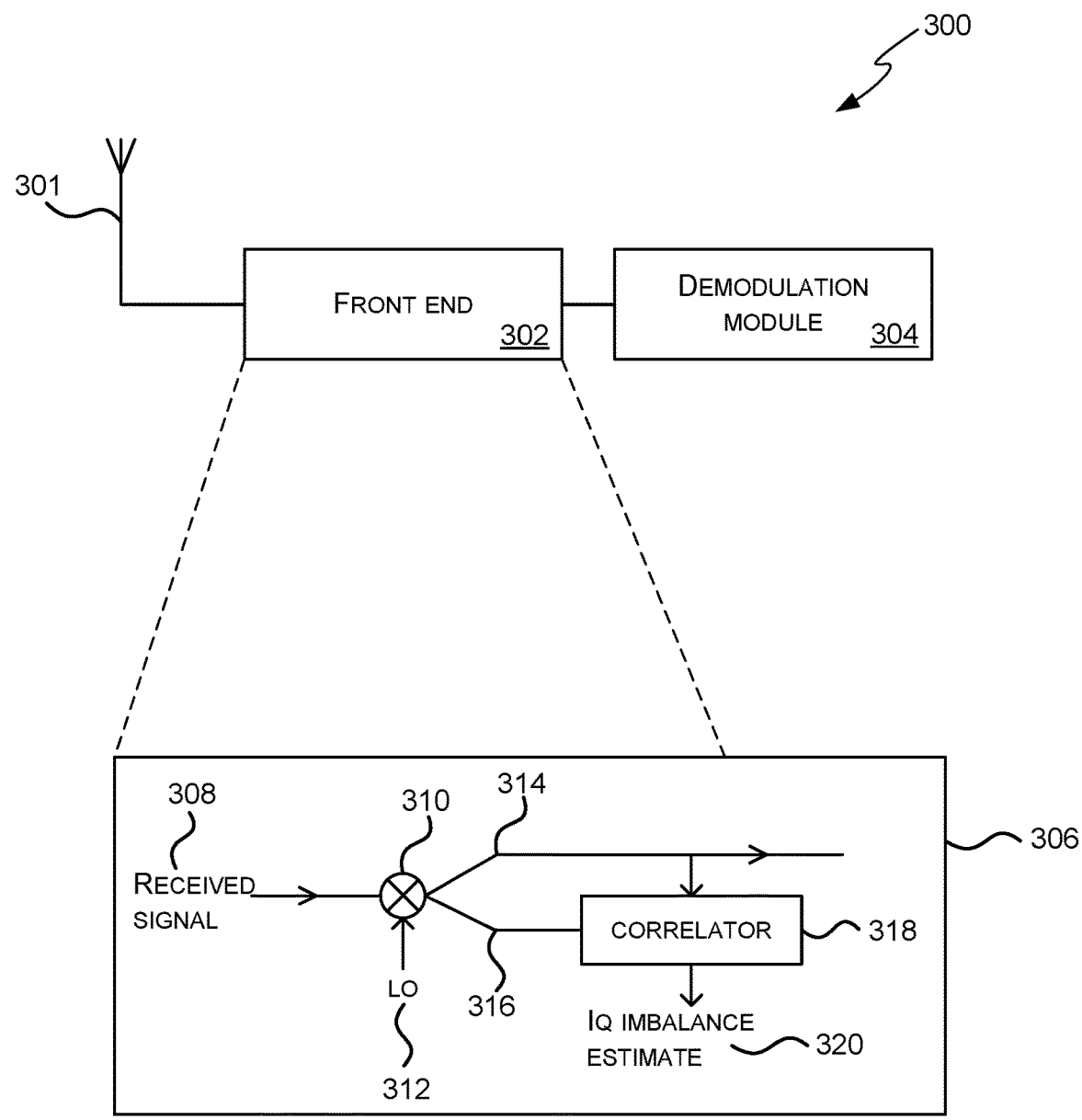
FIG. 3 is a schematic diagram of an example RF receiver.

FIG. 3 is a schematic diagram of an example RF receiver 300, e.g. a radio receiver, a TV receiver or a WiFi™ receiver. The RF receiver 300 includes one or more antennas 301, a front end 302 which performs channel selection and signal amplification and a demodulation module 304 which demodulates the signal output by the front end 302. The IQ imbalance estimation is performed within the front end 302 as shown in the expanded portion 306. As shown in FIG. 3, the received signal 308 (at frequency F) is shifted to baseband by mixing it (in mixer 310) with a local oscillator (LO) 312, where this mixer may be referred to as a 'positive frequency mixer' (as it shifts the signal at frequency +F). This generates an output 314 from the positive frequency mixer 310. As described above, although the local oscillator is described as being used to shift the signal to baseband, in other examples it may be used to shift to another frequency.

If the received signal 308 (which may also be referred to as the input signal to the mixer 310) is written as $R(t)+jI(t)$, where $j=\sqrt{-1}$, $R(t)$ is the real part of the received signal (which may also be referred to as the in-phase component) and $I(t)$ is the imaginary part of the received signal (which may also be referred to as the quadrature component) and the positive frequency local oscillator 312 is written as $c(t)+js(t)$, where $c(t)=\cos(\omega t)$ and $s(t)=\sin(\omega t)$, then the positive frequency mixer output 314 is as follows (where the (t) has been omitted to improve clarity):

$$\text{Positive frequency mixer output} = (R+jI)(c+js) = (Rc-Is)+j(Rs+Ic)$$

As described above, to calculate the IQ imbalance estimate, a correlation is performed between this first mixer output and a shifted and inverted version of the signal at −F. One way of generating this second signal is to mix the signal at −F with a second local oscillator in a negative frequency mixer (as it shifts the signal at frequency −F) and then to invert the signal of the output of the negative frequency mixer.

However, a more efficient way of generating the same signal (i.e. a signal which is equivalent to the inverted negative frequency mixer output) is shown in FIG. 3 which does not use a second LO or a second mixer (i.e. there is no negative frequency mixer). Instead, in addition to generating the positive frequency mixer output 314 (which will now be referred to as the 'first mixer output 314'), a second mixer output 316 is generated from the positive frequency mixer 310. Using the same notation as above, the two outputs 314, 316 from the positive frequency mixer have the form:

$1^{st}$ mixer output 314=$(Rc-Is)+j(Rs+Ic)$ $2^{nd}$ mixer output 316=$(Rc+Is)-j(-Rs+Ic)$ Comparing the first and second mixer outputs it can be seen that the second mixer output 316 can be generated from the same partial products (Rc, Is, Rs, Ic) used to generate the first mixer output 314.

Having generated two outputs 314, 316 from the positive frequency mixer 310, the two outputs 314, 316 are input to a correlator 318 (which may alternatively be referred to as 'correlation logic') and the real part of the output of the correlator 318 is an estimate 320 of the IQ amplitude imbalance. As described above, this estimate 320 can then be used in a closed loop to compensate the IQ amplitude imbalance and therefore the estimate 320 may be referred to as an IQ amplitude imbalance metric.

Referring back to the equations for the mixer outputs above, they may further be written as:

Real part of $1^{st}$ mixer output=$m1Real=Rc-Is$

Imaginary part of $1^{st}$ mixer output=$m1Imag=Rs+Ic$

Real part of $2^{nd}$ mixer output=$m2Real=Rc+Is$

Imaginary part of $2^{nd}$ mixer output=$m2Imag=Rs+Ic$

In various examples, the IQ amplitude imbalance metric may be calculated as follows:

IQmetric=sum($m1Real*m2Real+m1Imag*m2Imag$)

where the sum( ) function is an accumulation over the AGC period, equivalent to the accumulation of I*Q for the current IQ angle error estimate. The sum( ) function above provides a result that relates to the correlation between the shifted original and mirror image signals.

Figure 4:
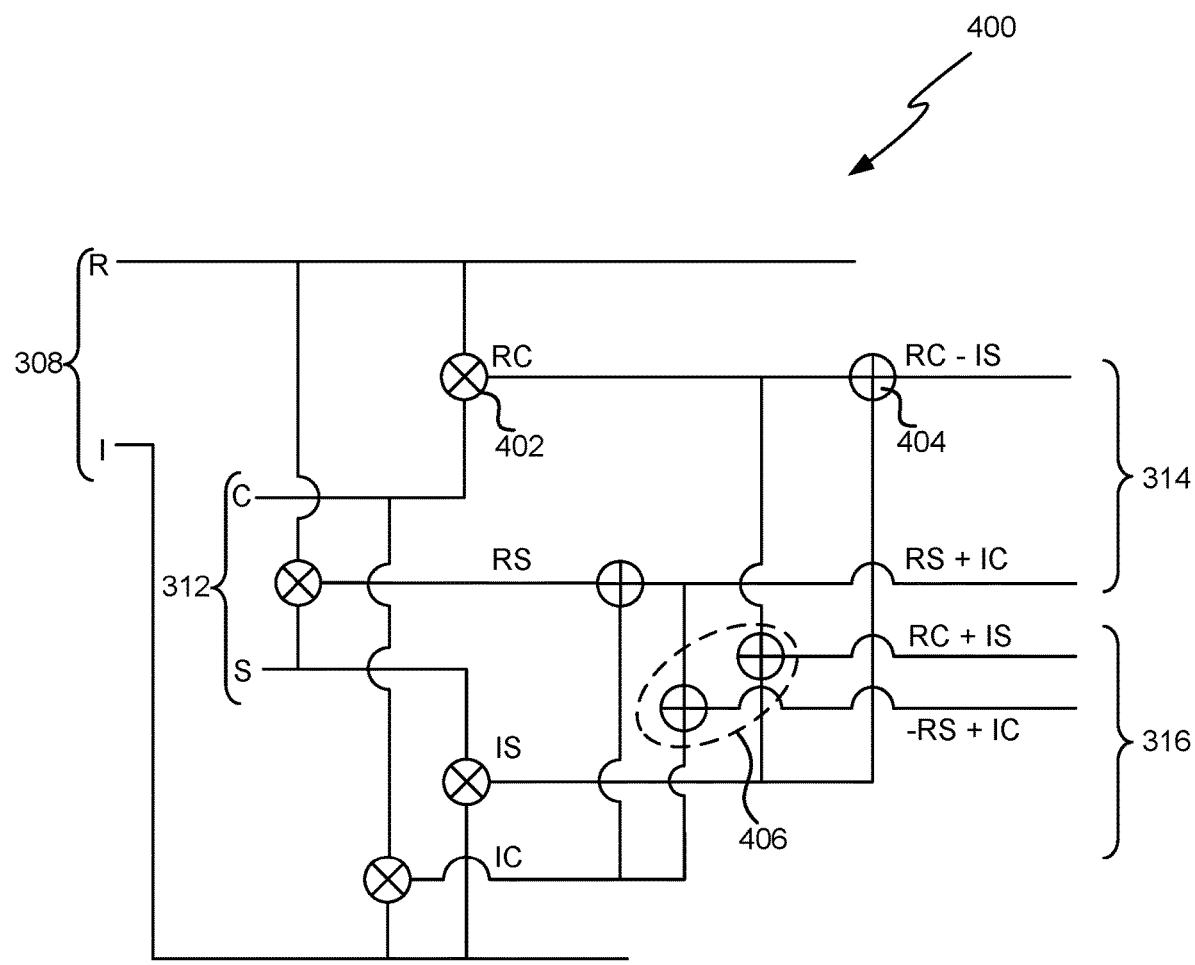
FIG. 4 is a schematic diagram showing an example digital implementation of a positive frequency mixer with two outputs.

FIG. 4 is a schematic diagram showing an example digital implementation 400 of the positive frequency mixer 310. The mixer 310 comprises multipliers 402 (shown by symbol ⊗) and adders 404 (shown by symbol ⊕). As shown in FIG. 4, the second mixer output 316 can be generated within the mixer 400 using two additional adders (identified by dotted outline 406).

Generating the second signal for use in the correlation in the positive frequency mixer 310 as described above provides a very efficient implementation in terms of space (e.g. silicon area, which in turn impacts cost), as only minimal extra logic is required, and power consumption.

Figure 5:
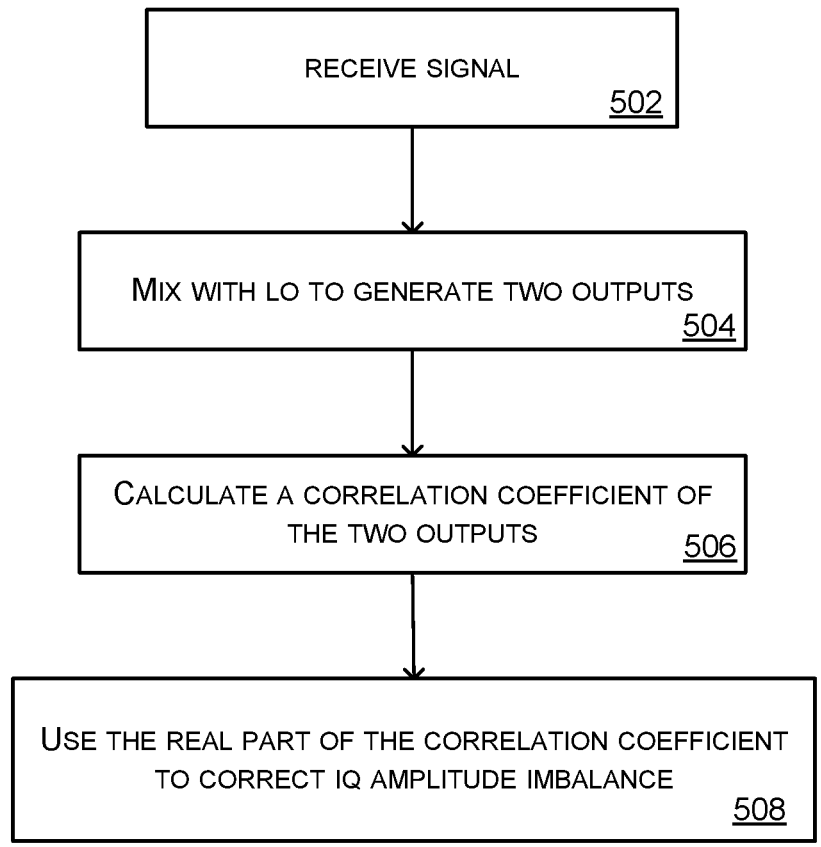
FIG. 5 is a flow diagram showing an example method of calculating an IQ amplitude imbalance metric.

FIG. 5 is a flow diagram showing an example method of calculating an IQ amplitude imbalance metric as described above. A signal 308 is received (block 502) and this signal 308 is mixed with a positive frequency local oscillator signal 312 to generate two outputs 314, 316 (block 504). As described above, both these outputs 314, 316 are generated using the same partial products generated within a positive frequency mixer 310. A correlation is then performed between these two outputs 314, 316 (block 506) and the real part of the output from the correlation operation (in block 506) is used as the IQ amplitude imbalance metric. As shown in FIG. 6, this metric 320 can be used to compensate for the IQ amplitude imbalance within a receiver (block 508). In various examples, the IQ amplitude imbalance metric may be an accumulation (i.e. a running sum over time) of the real part of the output from the correlation operation over the AGC (Automatic Gain Control) period.

The methods described above may be used in many different receivers. In various examples, the methods may be used within a radio receiver such as a receiver capable of receiving FM, DAB and/or AM radio transmissions (e.g. a receiver which operates in VHF bands II and/or III and/or a low frequency audio receiver). In various examples, the methods may be used within a WiFi™ receiver and/or a digital TV receiver.

In various examples, the methods described herein may be used to provide a low complexity (and hence low cost) fully integrated radio receiver which has the same performance as a much more complex (and hence expensive) superheterodyne radio receiver.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. An apparatus comprising:
    an input arranged to receive a signal;
    a mixer arranged to mix the received signal with a local oscillator signal and to generate both a first mixer output and a second mixer output; and
    correlation logic arranged to generate an IQ amplitude imbalance metric by calculating a correlation of the first and second mixer outputs generated by the mixer;
    wherein the mixer is arranged to generate four partial products from the received signal and the local oscillator signal; and
    wherein the first and second mixer outputs are generated by combining the four partial products in two different ways.

2. The apparatus according to claim 1, further comprising:
    a closed loop arranged to use the IQ amplitude imbalance metric to compensate IQ imbalance in the received signal.

3. The apparatus according to claim 1, wherein the IQ amplitude imbalance metric is a real part of the correlation of the first and second mixer outputs.

4. The apparatus according to claim 1, wherein the first mixer output comprises a real part given by:

$$m1\text{Real}=Rc-Is$$

and an imaginary part given by:

$$m1\text{Imag}=Rs+Ic$$

and the second mixer output comprises a real part given by:

$$m2\text{Real}=Rc+Is$$

and an imaginary part given by:

$$m2\text{Imag}=Rs+Ic$$

where R is a real part of the received signal, I is an imaginary part of the received signal, c is a real part of the local oscillator signal and s is an imaginary part of the local oscillator signal.

5. The apparatus according to claim 4, wherein the IQ amplitude imbalance metric is given by:

$$\text{IQmetric}=\text{sum}(m1\text{Real}*m2\text{Real}+m1\text{Imag}*m2\text{Imag})$$

where the sum( ) function is an accumulation over an AGC period.

6. A radio receiver comprising the apparatus as set forth in claim 1.

7. The radio receiver according to claim 6, wherein the radio receiver is a digital television receiver and/or a WiFi™ receiver.

8. The radio receiver according to claim 6, wherein the radio receiver is arranged to receive broadcast radio signals, wherein the broadcast signals comprise at least one of: VHF band II signals, VHF band III signals and low frequency audio signals.

9. The radio receiver according to claim 8, wherein the radio receiver is at least one of: a DAB (Digital Audio Broadcasting) receiver, an FM radio receiver and an AM radio receiver.

10. A method comprising:
    receiving a signal;
    mixing the signal with a local oscillator signal in a single mixer to generate both a first and a second mixer output; and
    calculating an IQ amplitude imbalance metric by performing a correlation of the first and second mixer outputs generated by the mixer;
    wherein mixing the signal with a local oscillator signal to generate a first and a second mixer output comprises:
    generating four partial products within a mixer from the received signal and the local oscillator signal; and
    combining the four partial products in two different ways to generate the first and second mixer outputs.

11. The method according to claim 10, further comprising:
    using the IQ amplitude imbalance metric in a closed loop to compensate an IQ amplitude imbalance.

12. The method according to claim 10, wherein the IQ amplitude imbalance metric is a real part of the correlation of the first and second mixer outputs.

13. The method according to claim 10, wherein the first mixer output comprises a real part given by:

$$m1\text{Real}=Rc-Is$$

and an imaginary part given by:

$$m1\text{Imag}=Rs+Ic$$

and the second mixer output comprises a real part given by:

$$m2\text{Real}=Rc+Is$$

and an imaginary part given by:

$$m2\text{Imag}=Rs+Ic$$

where R is a real part of the received signal, I is an imaginary part of the received signal, c is a real part of the local oscillator signal and s is an imaginary part of the local oscillator signal.

14. The method according to claim 13, wherein the IQ amplitude imbalance metric is given by:

$$\text{IQmetric}=\text{sum}(m1\text{Real}*m2\text{Real}+m1\text{Imag}*m2\text{Imag})$$

where the sum( ) function is an accumulation over an AGC period.

15. The method according to claim 10, wherein the method is implemented within a radio receiver, digital television receiver and/or a WiFi™ receiver.

16. The method according to claim 15, wherein the radio receiver is arranged to receive broadcast radio signals, wherein the broadcast signals comprise at least one of: VHF band II signals, VHF band III signals and low frequency audio signals.

17. A non-transitory computer readable storage medium having stored thereon computer readable instructions that, when processed at a computer system for generating a manifestation of an integrated circuit, cause the computer system to generate a manifestation of an integrated circuit comprising the apparatus as set forth in claim 1.

18. A non-transitory computer readable storage medium having stored thereon computer readable instructions that, when processed at a computer system for generating a manifestation of an integrated circuit, cause the computer system to generate a manifestation of an integrated circuit comprising a receiver configured to perform the method as set forth in claim 10.

* * * * *

UNITED STATES PATENT AND TRADEMARK OFFICE
CERTIFICATE OF CORRECTION

PATENT NO.        : 10,693,513 B2
APPLICATION NO.   : 14/977988
DATED             : June 23, 2020
INVENTOR(S)       : Adrian John Anderson Page 1 of 1

It is certified that error appears in the above-identified patent and that said Letters Patent is hereby corrected as shown below:

In the Claims

Column 8, Line 23 Claim 10:
Please delete "single"

Column 9, Line 11 Claim 17:
Please replace "comprising the apparatus as set forth in claim 1" with -- comprising the apparatus of claim 1 --

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*